United States Patent [19]

Baudoin et al.

[11] 4,030,376
[45] June 21, 1977

[54] DEVICE FOR APPLYING TENSION TO BELTS OR CABLES FOR A REMOTE MANIPULATION

[75] Inventors: Jean-Claude Baudoin, Paris; Robert Oger, Antony, both of France

[73] Assignee: Commissariat a l'Energie Atomique, Paris, France

[22] Filed: Feb. 20, 1976

[21] Appl. No.: 659,709

[30] Foreign Application Priority Data

Mar. 6, 1975 France .................. 75.07086

[52] U.S. Cl. ............... 74/242.11 C; 74/242.11 R; 74/242.11 S; 74/242.15 R
[51] Int. Cl.² ............ F16H 7/12; F16H 7/10
[58] Field of Search ........... 74/242.11 C, 242.11 P, 74/242.11 S, 242.11 R, 242.15 R

[56] References Cited

FOREIGN PATENTS OR APPLICATIONS 445,152  4/1936  United Kingdom ......... 74/242.11 S Primary Examiner—Leonard H. Gerin
Attorney, Agent, or Firm—Cameron, Kerkam, Sutton, Stowell & Stowell

[57] ABSTRACT

A spring system mounted on a supporting bar which is rigidly fixed to an element of a remote manipulator is continuously applied against the motion-transmission belts or cables with a substantially constant force in order to take up the slack of these latter. The spring system is constituted by a series of parallel leaf-spring elements equal in number to the cables or belts to be tensioned, each element being constituted by an auxiliary spring-leaf applied against a main spring-leaf. A bridge-piece is fitted at the end of the main spring-leaf and mounted astride the corresponding belt or cable.

6 Claims, 8 Drawing Figures

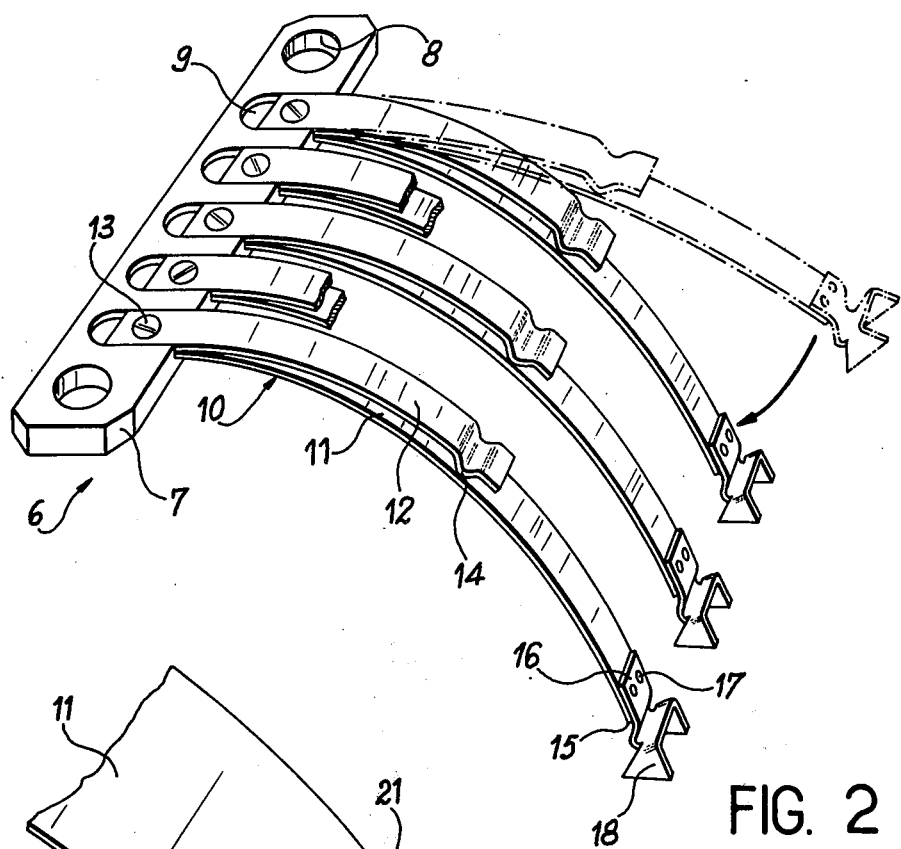
FIG. 2
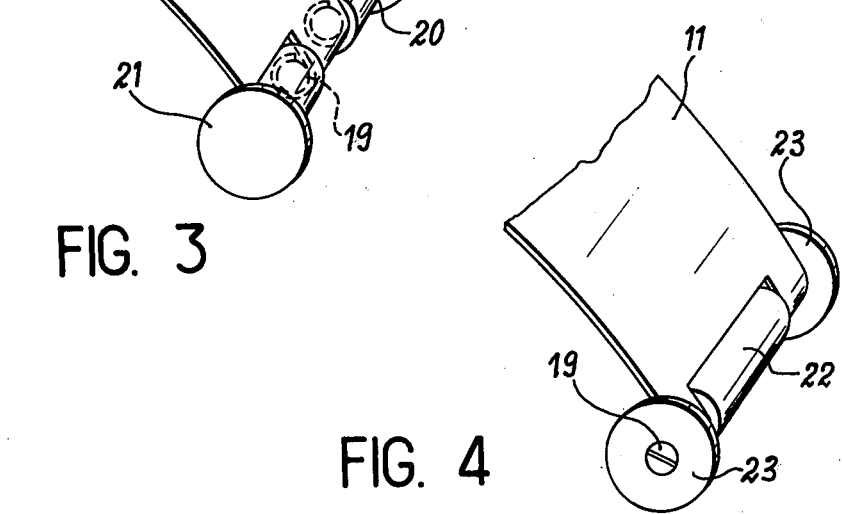
FIG. 3
FIG. 4

DEVICE FOR APPLYING TENSION TO BELTS OR CABLES FOR A REMOTE MANIPULATION

This invention relates to a device for applying tension to belts, cables or the like for ensuring transmission of movements in a remote manipulator, especially through the articulations provided between successive sections or arm elements of said remote manipulator.

In equipment units of this type which are well known in the technique, the remote manipulator is usually constituted by an articulated assembly which comprises in particular a tong-unit, a fore-arm and an arm with articulations for relative pivotal motion about wrist, elbow and shoulder pins. A so-called slave assembly of this type can be controlled either directly by actuating motors carried by the assembly itself or by means of a so-called master assembly of similar design which is separated from the slave assembly by a shield wall, the tong-unit at the slave end being replaced by a wrist at the master end. In these handling devices, the above-mentioned articulations are provided with a set of parallel pulleys mounted on their pivotal axes. Belts or cables are passed within the grooves of said pulleys and attached at their extremities to certain portions of the manipulator so that a particular movement is produced by the differential or combined action exerted on one or a number of said belts or cables. The movement of aforesaid corresponds for example to closure of the tong-unit, to a pivotal movement of this latter above its wrist-pin, to a movement of rotation of said tong-unit with respect to the fore-arm pin, to a pivotal movement of the fore-arm about the elbow pin or finally to a pivotal movement of the arm with respect to the shoulder-pin.

Due consideration being also given to the appreciable dimensions of the different elements of remote manipulators as well as of the length of the belts or cables which are necessary, there is a potential danger of failure or breakdown during the operation of equipment units of this type. Such failures can result from the fact that the belts, cables or the like come off their guide pulleys and fall back against the cheeks of these latter or even escape altogether and fall outside the pulleys; in the majority of cases, this results in scoring, tearing or nicking which results in almost certain rupture in a very short time.

The present invention relates to a device which serves to apply tension to belts or cables of this type, which is of very simple design and which overcomes the disadvantage mentioned in the foregoing.

To this end, the device under consideration comprises a spring system mounted on a supporting bar which can be rigidly fixed to an element of the remote manipulator, said spring system being continuously applied against the belts or cables with a substantially constant force in order to take up the slack of these latter, said spring system being provided with a series of parallel elements equal in number to the belts or cables to be tensioned, each element being provided with an auxiliary spring-leaf applied against a main spring-leaf having a bridge-piece fitted at the end of said main spring-leaf and mounted astride the corresponding belt or cable.

In a particular embodiment of the invention, the bridge-piece provided at the end of each main spring-leaf is constituted by a bracket fixed on the leaf by means of rivets or other means. By way of alternative, the bridge-piece is constituted by a spindle on which is freely mounted for rotation at least one sleeve applied against the belt and terminating in two side flanges for guiding the edges of said belt. In another alternative embodiment, the flanges in turn support two parallel rollers on which the edtes of the belt are intended to run. Finally and in another embodiment which is more especially adapted to the use of a cable, the end of each main spring-leaf has a central pulley, the corresponding cable being engaged in the groove of said pulley.

Further characteristic features of a tensioning device as constructed in accordance with the invention will become apparent from the following description of a number of examples of construction which are given by way of indication without any limitation being implied, reference being made to the accompanying drawings, wherein:

FIG. 2 is a perspective view to a larger scale and showing the device under consideration;

FIGS. 3 to 8 are detail views to a larger scale and showing a number of alternative embodiments of the device aforesaid.

Figure 1:
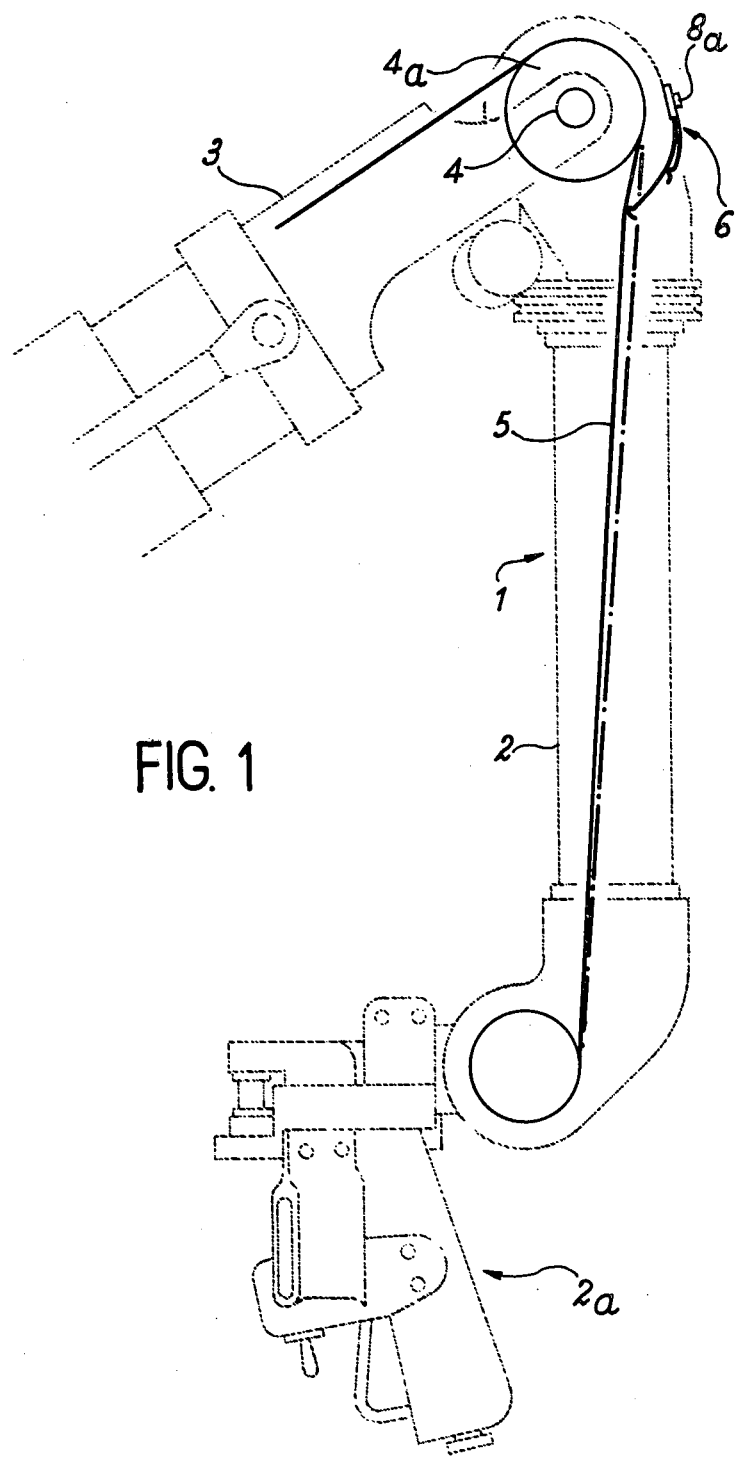
FIG. 1 is a diagrammatic, part-sectional view in perspective showing a portion of the remote manipulator and illustrating two articulated elements provided with a tensioning device in accordance with the invention.

In FIG. 1, the reference numeral 1 designates diagrammatically a portion of a remote manipulator of a type which is conventional per se and the construction detail of which has little bearing on the invention. Said remote manipulator comprises in particular a fore-arm 2 and an arm 3 which are articulated with respect to each other and pivotally mounted on an elbow pin 4. There are mounted on said pin 4 guide pulleys 4a for a series 5 of belts, cables or the like which make it possible by means of a control handle 2a which is pivotally mounted at the end of the fore-arm 2 to transmit different controlled movements through said articulation.

In accordance with the invention, tension is continuously applied to the belts or cables 5 in order to maintain these latter within the grooves of their guide pulleys 4a without any attendant danger of disengagement. This is achieved by means of a device which is generally designated by the reference numeral 6 and the constructional detail of which is brought out more clearly in FIG. 2. This device mainly comprises a mounting bar 7 provided with holes 8 through which are passed lock-screws 8a (as shown in FIG. 1) which are intended to secure said mounting bar to the fore-arm 2 or to any other element of the remote manipulator in the vicinity of one of the pulleys which are mounted on the elbow pin 4. Open-edged grooves 9 are formed in the bar 7 and leaf-spring elements 10 equal in number to the cables, belts or the like are intended to be mounted in the arm element considered by means of said grooves.

In the example of construction which is more especially considered, the mounting bar 7 is provided with five leaf-spring elements 10 of this type, each element being constituted by a main spring-leaf 11 duplicated by an auxiliary spring-leaf 12, the complete assembly being locked in position by means of countersunk-head screws 13 at the level of the grooves 9 of the mounting bar 7. Each auxiliary spring-leaf 12 is provided at the free end thereof with a boss 14 which is applied against the main spring-leaf 11 in order to subject this latter to a force which tends to apply it against the corresponding belt 5. In order to ensure suitable guiding of the belt, the main spring-leaf 11 is provided with a bridge-piece 15 at that end which is intended to cooperate with the belt 5. Said bridge-piece is constituted by a bracket 16 which is securely maintained against the leaf by means of rivets 17 and provided with a fork 18 which is mounted astride the belt.

Figure 5:
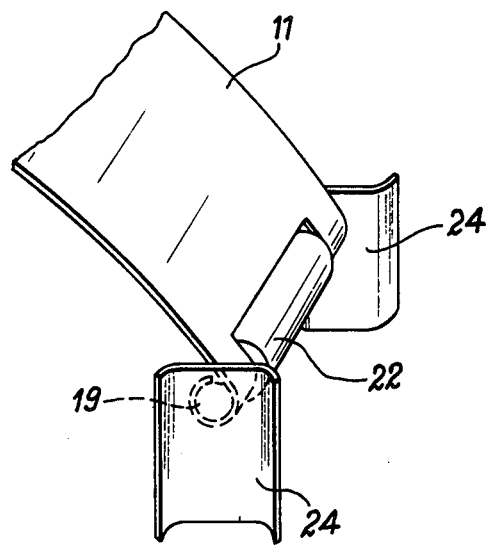

In the alternative embodiment which is illustrated in FIG. 3, that end of the main spring-leaf 11 which is associated with each belt 5 is no longer provided with a bracket as in the previous example but with a cross-pin 19 on which are freely mounted spool-type sleeves 20 with flanged ends 21 which are capable of fitting astride the edges of the belt and sliding along this latter. In another alternative embodiment which is illustrated in FIG. 4, the cross-pin 19 is fitted with a single central roller 22, the end flanges 23 of which serve to guide the belt as in the previous embodiment. Finally, in another alternative form shown in FIG. 5, the flanges provided at the end of the cross-pin 19 are replaced by shaped cheeks 24 which perform a similar function.

Figure 6:
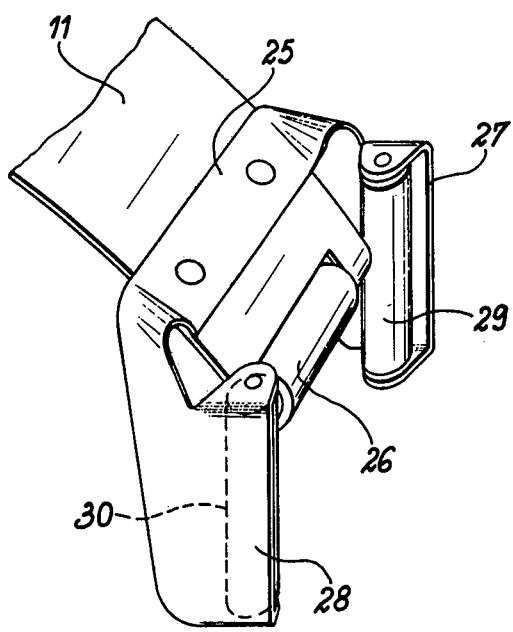

In the particular case in which it is desired to apply a suitable tensile load to each belt of the remote manipulator while at the same time preventing any friction between the bearing leaf-spring elements and said belt, it is an advantage to adopt the embodiment shown in FIG. 6. In this example, the end of the main spring-leaf 11 is fitted with a stirrup-piece 25 which is riveted on the end of the leaf and cooperates with a central roller 26, said roller being intended to bear on the belt. Said stirrup-piece 25 is also provided with two lateral arms 27 and 28 for supporting two vertical rollers 29 and 30 which run on the edges of the belt.

Figure 7:
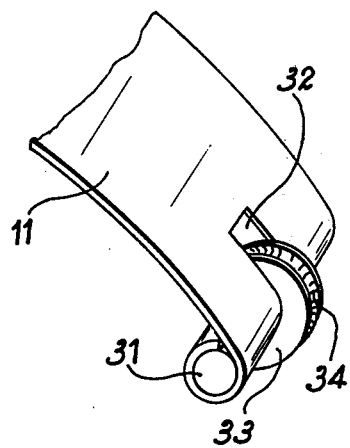

In the alternative embodiment shown in FIG. 7, the end portion of the main spring-leaf 11 is provided with a shaft 31 and has a central recess 32 in which is mounted a pulley 33, said pulley being freely rotatable on said shaft 31 and provided with a groove 34. This alternative embodiment is more especially adapted to the case in which the remote manipulator makes use of cables instead of belts for the transmission of movements, each cable being intended to engage in the groove 34 of a pulley 33.

Figure 8:
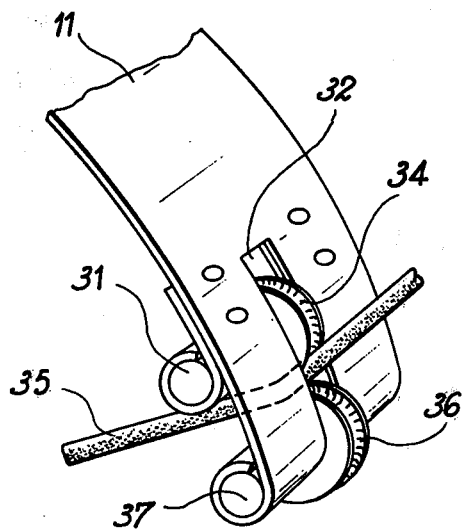

Finally, in the alternative embodiment shown in FIG. 8, the pulley 34 for guiding the cable 35 is associated with a second pulley 36 which is mounted at the end of the main spring-leaf 11, said second pulley being carried by a removable shaft 37. This arrangement permits better maintenance of the cable between the two pulleys while also permitting easy assembly and disassembly.

It is readily apparent that the invention is not limited solely to the different examples of construction described in the foregoing and illustrated in the accompanying drawings but extends on the contrary to all alternative forms.

We claim:

1. A device for applying tension to belts or cables for a remote manipulator and comprising a spring system mounted on a supporting bar which can be rigidly fixed to an element of the remote manipulator, a spring system continuously applied against the belts or cables with a substantially constant force in order to take up the slack of said belts or cables, said spring system being provided with a series of parallel elements equal in number to the belts or cables to be tensioned, each element being provided with an auxiliary spring-leaf applied against a main spring-leaf having a bridge-piece fitted at the end of said main spring-leaf and mounted astride the corresponding belt or cable.

2. A device according to claim 1, wherein the bridge-piece provided at the end of each main spring-leaf is constituted by a bracket fixed on the leaf by means of rivets or other means.

3. A device according to claim 1, wherein the bridge-piece is constituted by a spindle on which is freely mounted for rotation at least one sleeve applied against the belt and terminating in two side flanges for guiding the edges of said belt.

4. A device according to claim 3, wherein the flanges in turn support two parallel rollers on which the edges of the belt are intended to run.

5. A device according to claim 1, wherein the end of each main spring-leaf has at least one central pulley, the corresponding cable being engaged in the groove of said pulley.

6. A device according to claim 5, wherein the cable is guided between two pulleys mounted at the end of the main spring-leaf.

* * * * *